United States Patent [19]

Pan

[11] Patent Number: 5,574,674
[45] Date of Patent: Nov. 12, 1996

[54] FOURIER TRANSFORM PROCESSING FOR DIGITAL FILTERS OR OTHER SPECTRAL RESOLUTION DEVICES

[76] Inventor: Cheh Pan, 13263 Paramount Dr., Saratoga, Calif. 95070

[21] Appl. No.: 209,251

[22] Filed: Mar. 14, 1994

[51] Int. Cl.⁶ ........................................ G06F 15/00
[52] U.S. Cl. .......................................... 364/726
[58] Field of Search ................... 364/726, 827, 364/725

[56] References Cited

U.S. PATENT DOCUMENTS

| | | | |
|---|---|---|---|
| 4,501,014 | 2/1985 | Bluthgen | 381/94 |
| 4,945,234 | 7/1990 | Goodman et al. | 250/291 |
| 5,327,521 | 7/1994 | Savic et al. | 395/2.81 |

*Primary Examiner*—Roy N. Envall, Jr.
*Assistant Examiner*—Emmanuel L. Moise
*Attorney, Agent, or Firm*—Robert S. Kelly

[57] ABSTRACT

A process for suppressing the Gibbs phenomenon in a train of digital signals when such signals are undergoing a discrete Fourier transform or a fast Fourier transform without using the conventional windowing techniques wherein the original function defined by the initial set of digital signals is changed into a new function so that the first and last data points thereof are made equal to make the waveform of the new function each a complete cycle within its DFT period while the interrelationship of the remaining data points remain as in the original function, so that no spurious frequency components are introduced in the digital signal output. The process is shown as used in an all-purpose digital filter.

10 Claims, 5 Drawing Sheets

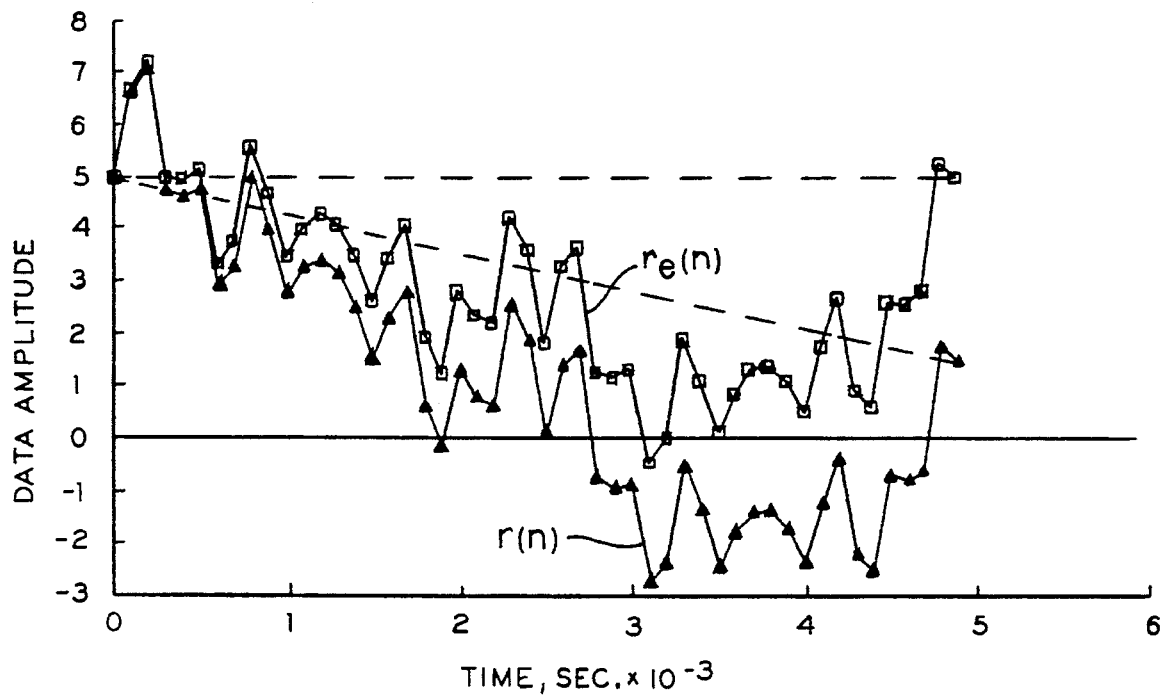
fig_6
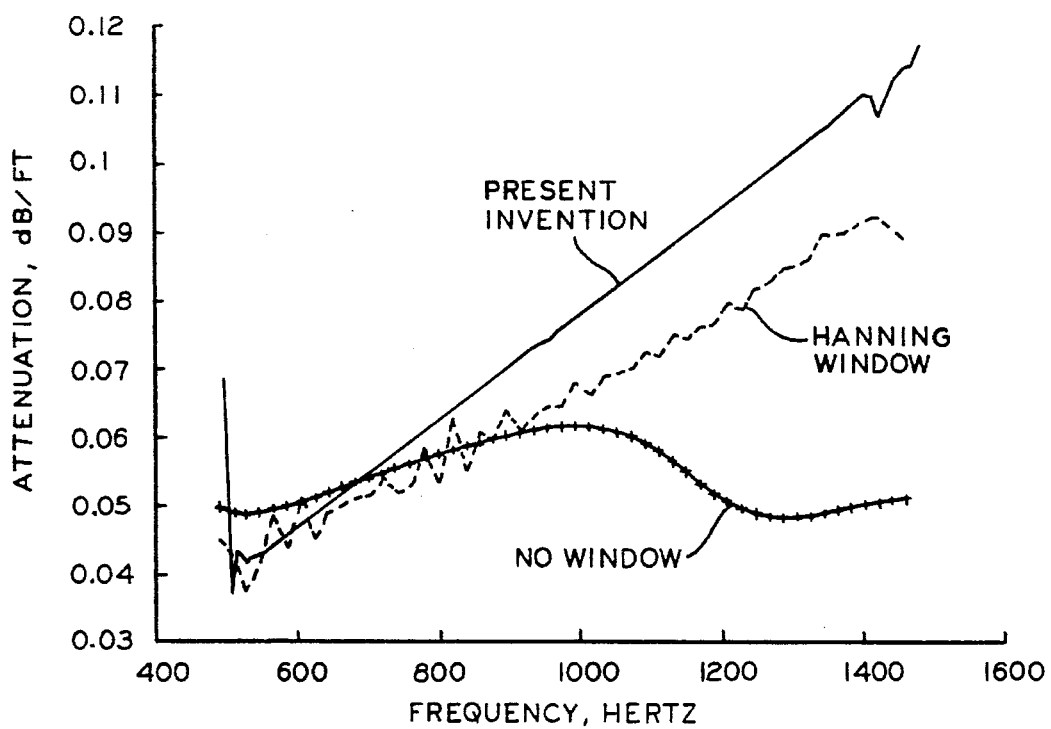
fig_7

FOURIER TRANSFORM PROCESSING FOR DIGITAL FILTERS OR OTHER SPECTRAL RESOLUTION DEVICES

BACKGROUND OF THE INVENTION

1. Field of the Invention

The present invention pertains to means and methods for processing digital signals, and more particularly, it pertains to digital techniques or digital processors, such as digital filters or other spectral resolution devices, which digitally compute the Fourier transform of a sequence of digital data signals.

2. Description of the Prior Art

In the design of distal filters or other digital devices requiring spectral resolution (e.g., spectral ratio measuring devices to determine the attenuation coefficient or quality factor from seismic and acoustic dam), a commonly used technique is the discrete Fourier transform (DFT) or the fast Fourier Waveform (FFT) wherein a sequence of digital data readings or train of digital signals, in the time domain is transformed into the frequency domain for a selective elimination (digital filtering) or ratio measurement (attenuation coefficient or Q factor measuring). A continuing problem with such methods is the well known Gibbs phenomenon which appears in a discrete Fourier transform due to the incomplete DFT periodicity of the arbitrary sequence of digital data that is a sequence started at an arbitrary point in time. That is to say, the start and end values in the digital data sequence provide discontinuities which introduce spurious frequency components into the Fourier transformed data or distort the frequency components which are already present. The conventional way to treat the Gibbs phenomenon is to apply a window function to the data sequence to taper the data to zero at the end points. However, the use of the conventional windowing technique may distort the frequency components to be measured or induce spectral leakage, i.e., the introduction of spurious frequency components.

SUMMARY OF THE INVENTION

With the present invention, a technique for suppressing the Gibbs phenomenon in a DFT (or FFT) is provided without utilizing the conventional windowing method. This novel technique involves taking the first sequence, defined by the discrete numerical values of the input train of digital signals, and creating a second, new sequence of discrete numerical values with the end value of the second sequence equaling its first value (i.e., the first and last digital values are forced to be equal) while retaining the essential interrelationship of the remaining digital values of the first sequence without distortion so as to preserve undistorted the frequency components of the signal train except for those introduced by the Gibbs phenomenon due to the discontinuities of the signal waveform at the start and end of the train of signals. Thus, the frequency components of the first sequence are retained without distortion, and spurious frequency components are not introduced.

Such a second sequence of digital signals can be created by two essentially different techniques within the bounds of the present invention, by "data flipping", or by "baseline tilting". In the data flipping technique the new sequence is created from the first sequence by adding a sequence of data values to the first sequence which are the precise reverse sequence of those values of the first sequence (i.e., "flipping" the data over). This creates an even function comprised of a new data set twice the length of the original data set with the second half of the data being the mirror image of the first half of the data. Such an even function has no discontinuities at the end points and also will not affect the spectral content of the original data. The newly created signal sequence is then transformed into the frequency domain by a conventional Fourier transform (DFT or FFT) method wherein the unwanted bands can be zeroed out (in filtering) or the selected bands may be used in spectral ratio measurements or the like. The passed or selected bands may then be inversely transformed back into the time domain to complete the digital filtering process. After filtering, only the original length of the data needs to be preserved.

The baseline tilting technique involves taking the original data sequence, shifting the last value thereof so that it is numerically equal to the first value in the data sequence, and altering each individual data value between the first and last values so as to reflect a tilting of the baseline of the data (i.e., a line drawn between the first and last values thereof) to render it of a uniform value therealong. This forces the first and last data values so as to preserve undistorted the frequency components of the signal waveform except for those introduced by the Gibbs phenomenon due to the discontinuities of the signal waveform at the start and end of the data to be equal but does so without altering the essential interrelationship of the remaining data values.

BRIEF DESCRIPTION OF THE DRAWINGS

FIG. 6 is a graph illustrating the conversion of a typical digital data sequence by baseline tilting according to the technique of the present invention.

FIG. 7 is a graph illustrating attenuation measured with the technique of the present invention as contrasted with the values obtained with the prior art techniques.

DESCRIPTION OF THE PREFERRED EMBODIMENT

Figure 1:
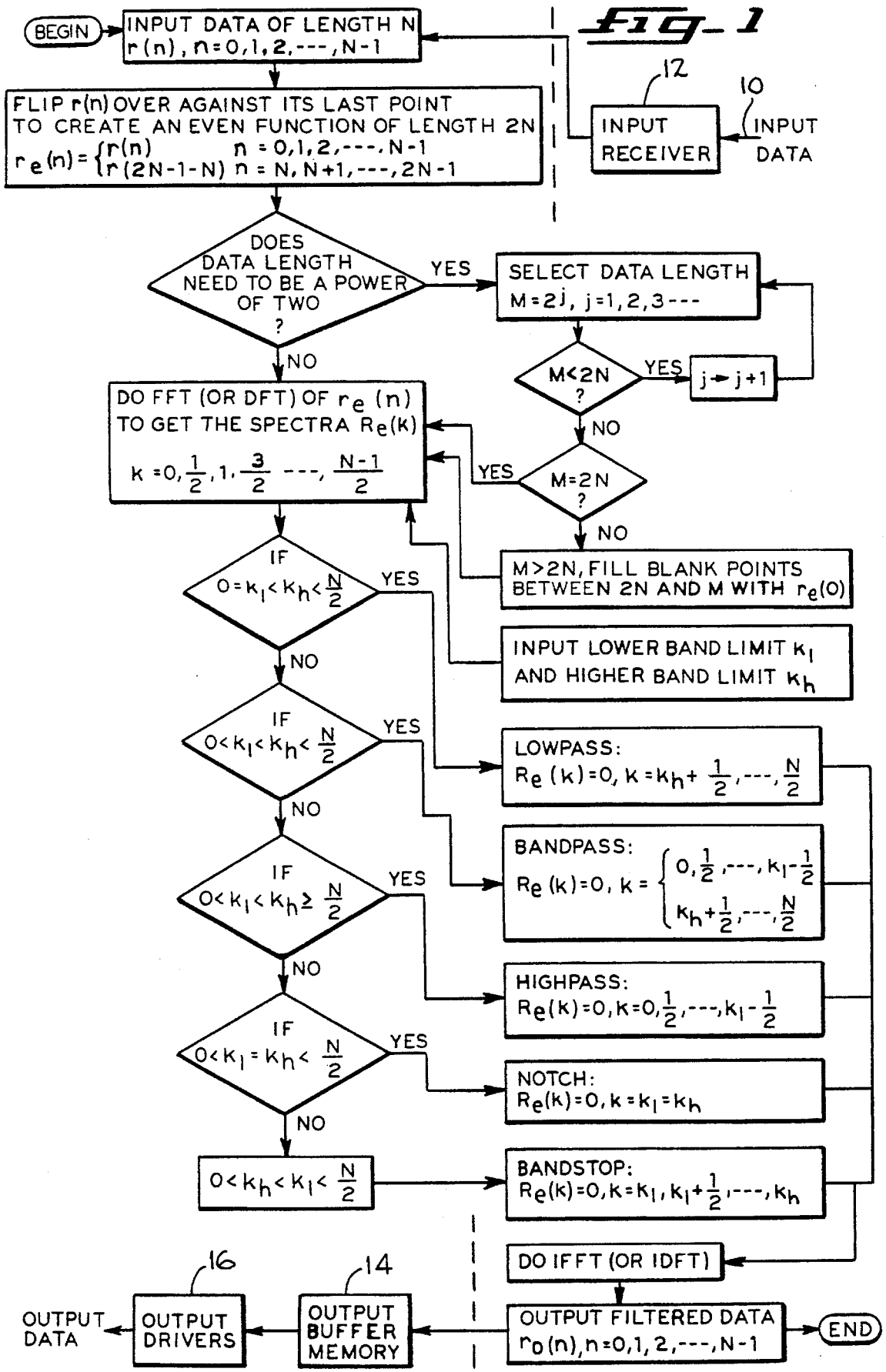
FIG. 1 is a diagrammatic representation of a digital filter embodying the present invention particularly including a flow chart depicting the computer or microprocessor programming for the digital filtering process utilizing the data flipping technique of the present invention.

An important mathematical tool in the implementation of digital filters or other distal processing devices which rely on the selection or measurement of spectra is the discrete Fourier transform (DFT). Its importance arises from the fact that it can be efficiently computed by using some very powerful algorithms known collectively as the fast Fourier transform (FFT) method. However, such digital transform methods are plagued by the so-called Gibbs phenomenon, an inherited property of the Fourier transform arising from the truncation of the Fourier series due to the finite length of the data received. Thus, the function defined by the sequence of digital data values actually received will have discontinuities at the end points, and this will distort the transformed frequency components or introduce spurious components into the transformed data. As explained previously, the conventional way to treat the Gibbs phenomenon is to taper the data to zero at the end points by the application of a so-called window function to the original data, typically by multiplying the original data function by a pre-defined function such as a one-half sinusoidal wave. However, this usually results in further distortion or spectral leakage and has not proved to be wholly satisfactory in many instances.

It has been discovered by me that the real task of the conventional windows is to force the end data points to become equal in order for the waveform represented by the sequence of distal data points to reach a complete DFT periodicity; i.e., to reach a complete periodic cycle at the end of the data sequence. From this discovery, a better revision of the original digital data is possible. For example, if the end values can be made equal while retaining the interrelationship of the remaining values of the data, a more accurate Fourier transformation of the data can be achieved. Thus, with the present invention, two different schemes are utilized for achieving a new function which make the end data points equal but which do not disturb the essential interrelationship of the remaining data points so as to distort the frequency components of the data or add any significant spurious frequency components to the data when the data is transformed into the frequency domain.

The first of such schemes has been dubbed data flipping which scheme eliminates the discontinuities at the end points with no weighting of the remaining data points, and it thus retains the essential frequency components of the original function without distortion or spectral leakage. In this scheme the data length is doubled by reflecting the original data across the last data point to create a new data set, i.e., the even function. This new function will thus be twice the length of the original data set with the last half thereof being a mirror image of the first half. That is to say, the first one-half of the new function is identical to the original function, the last point of the original function becomes the first added point of the new function, the second-to-last point becomes the second added point of the new function, and so forth, with the first point of the original function becoming the last point of the new function. This can be demonstrated mathematically as follows. Let $r(n)$, $n=0,1,2,\ldots,N-1$, be the original set of data to be transformed. Then, data flipping will create a new data set $r_e(n)$ such that, $$r_e(n) = \begin{cases} r(n) & n = 0,1,2,\ldots,N-1 \\ r(2N-1-n) & n = N, N+1, \ldots, 2N-1 \end{cases} \quad (1)$$

This defines an even function with an even number of data points and equal end points, and the equal data points $r_e(N-1)$ and $r_e(N)$ are at the center of mirror images of the data.

Let $R(k)$, $k=0,1,2,\ldots,(N-1)/2$, be the spectra of $r(n)$, then the spectra of $r_e(n)$ can be represented as, $$R_e(k') = \frac{1}{2}[R(k') + e^{-j\frac{2\pi k'}{N}} R^*(k')] \quad (2)$$

$$k' = 0, 1/2, 1, 3/2, \ldots, (N-1)/2$$

where $j=\sqrt{-1}$, $R(k')$ is identical to $R(k)$ except $k'=k/2$, and $R^*(k')$ is the conjugate of $R(k')$. The even symmetry of $r_e(n)$ gives $$R_e(k') = e^{-j\frac{2\pi k'}{N}} R_e^*(k').$$

The transform is therefore not real. The spectral content of the original data set is not affected by the data flipping, but the spectral resolution is doubled. That is to say, $k'=k/2=0,½, 1,3/2,\ldots,(N-1)/2$. Since the even function is not a window but has a full waveform cycle within its DFT period, it becomes equivalent to a periodic impulse train, and the Gibbs phenomenon will not appear in $R_e(k')$. It will be noted that $R_e(k')$ is not the original spectra $R(k)$ but is a combination of $R(k')$ and its phase-shifting conjugate $$e^{-j\frac{2\pi k'}{N}} R^*(k').$$

It should also be noted that $R(k')$ is not exactly identical to $R(k)$ since its spectral resolution has been doubled. Because of the phase-shifting interference between $R(k')$ and $$e^{-j\frac{2\pi k'}{N}} R^*(k')$$

when they are added together, $R_e(k')$ will exhibit an oscillation which is not in the original spectra $R(k)$. This oscillation or phase-shifting interference does not have a connection with the Gibbs phenomenon or any influence on the original spectra.

In carrying out the foregoing in a practical application of a spectral resolution device for transforming a train of digital signals from the time domain to the frequency domain, such as a digital filter, either a hardware or a software approach may be taken. FIG. 1 illustrates the software approach wherein a conventional computer or microprocessor is utilized to receive an input data of length N, and output the filtered data of length N with either lowpass, bandpass, highpass, notch or bandstop filtering being accomplished according to the input frequency band selection Thus, the train of digital signals is started at some arbitrary point in time and stopped at a later point in time as determined by the data length N times the time interval between each successive digital signal. The input data 10 is received by an input receiver 12 which is comprised of the conventional accumulator registers and buffers for feeding the data into the computer or microprocessor. From FIG. 1 it will be seen that the input data of length N, $r(n)$, $n=0,1,2,\ldots N-1$, is flipped over against its last point to create a new function $r_e(n)$ of a length 2N. If the data length needs to be a power of two, a loop shown in FIG. 1 determines an appropriate data length M that is the next highest data length above the length 2N. The blank points between the data length 2N and M are then filled with the value $r_e(O)$, the first point in the data sequence, which will reduce the end-effects in the filtering. A FFT (or DFT) is then performed on the new function $r_e(n)$ to get the spectra $R_e(k)$, with k=0,½,1,3/2, . . ., (N−1)/2.

Figure 2:
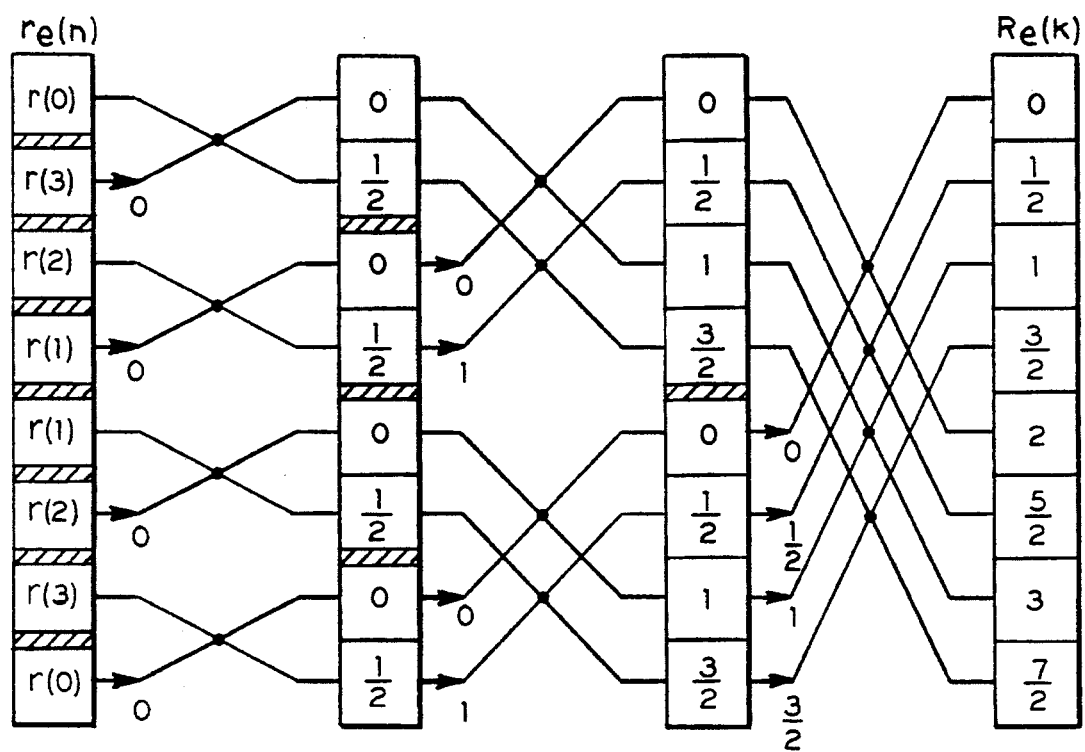
FIG. 2 is a diagrammatic chart illustrating the decimation-in-time FFT algorithm used in the data flipping technique of the process illustrated in FIG. 1.

A typical decimation-in-time algorithm for providing a fast Fourier transform (FFT) is diagrammatically shown in FIG. 2, For the purposes of this illustration it will be assumed that only four points, r(0), r(1), r(2), r(3), are in the original data sequence. With the original data in the even function, $r_e(n)$, running from r(0), r(1), r(2), r(3), r(3), r(2), r(1), r(0), the data is arranged as shown using the conventional "butterfly" flow indications, and the conventional complex multiplication and complex addition operations are performed as shown in four cycles.

Finally, as further shown in the algorithm sequence of FIG. 1, the frequency domain spectra $R_e(k')$ is then subjected to a series of tests to determine which type of filtering is to be performed. This information is input into the system by defining a lower band limit $k_1$ and a higher band limit $k_h$. If $k_1=0$ with $k_h$ greater than $k_1$ and smaller than N/2, a lowpass filter is selected and $R_e(k)$ will be provided as shown. If $k_1$ is greater than 0 and less than $k_h$, and $k_h$ is smaller than N/2, a bandpass filter is desired with the resulting spectra $R_e(k)$ being as indicated. For a highpass filter, $k_h$ will be greater than $k_1$ and also equal to or greater than N/2, the highest frequency obtainable in the Fourier spectra. If $k_1$ equals $k_h$, a notch filter is provided with the spectra $R_e(k')$ being as shown. Finally, if $k_1$ is input at a value higher than $k_h$, the circuitry will recognize the bandstop filter (as contrasted with the bandpass filtering operation) with the spectra $R_e(k')$ being as shown. The selected or "filtered" spectra $R_e(k')$ is then run through an inverse Fourier transform (IFFT or IDFT) in the conventional manner to provide an output set of data $r_o(n)$, n=0,1,2, . . .,N−1. This can be output as a train of digital signals to a conventional buffer memory 14 and the output drivers 16 to transmit the filtered data to the user. The capability of this digital filter in doing different filtering operations simply by a manipulation of the frequency band limits make it all-purpose filter as contrasted with the conventional digital filters which are only single purpose, e.g., a conventional lowpass filter can only be used to pass lower frequency bands.

It will be appreciated that the frequency sampling interval $\Delta k'$ in the filtering operation shown in FIG. 1 is determined by the time sampling interval $\Delta n$ and the original data length N; i.e., $$\Delta k' = \frac{1}{2N\Delta n}.$$

If either $\Delta n$ or N is small, then $\Delta k'$ will not necessarily be small. In such a case, it will be likely that no spectral points will be found exactly at the frequencies of the band limits ($k_1, k_h$) requested by the user. The filter will then be forced to search for the frequencies closest to the selected band limits thereby shifting the passbands or stopbands requested by the user. The flipping of data doubles the spectral resolution and will therefore reduce the band shift. Such a band shift can be further reduced by flipping the data more than once to further refine the spectral resolution, at the expense of computing time. In mathematical terms, $$\Delta k' = \frac{1}{2^m N\Delta n},$$

with m=1,2,. . . (the number of times that the data is flipped).

Figure 3:
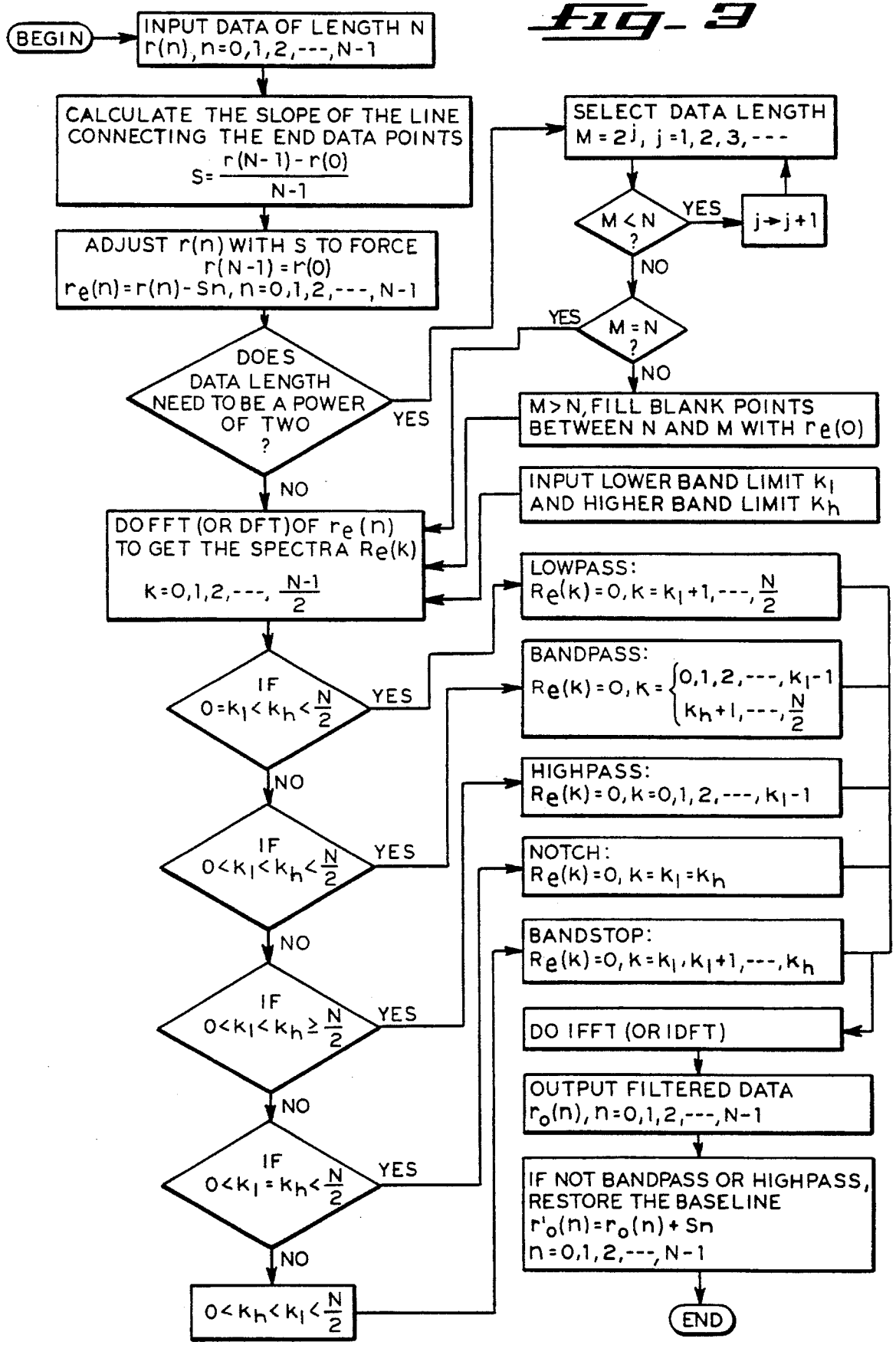
FIG. 3 is a flow chart particularly depicting the computer or microprocessor programming for a digital filtering process similar to FIG. 1 but utilizing the baseline tilting technique of the present invention.

The second scheme for achieving a new function $r_e(n)$ in order to make the end data points equal but not distort the essential interrelationship on the remaining data points is dubbed baseline tilting, and its software approach is illustrated in the flow chart in FIG. 3. This flow chart, disclosing a digital filtering operation, will be seen to be identical to the digital filtering flow chart of FIG. 1 except for the specific means or method used to create the new function $r_e(n)$. Thus, the original train of digital signals or data of length N is input into the computer or microprocessor and identified as the function r(n), with n=0,1,2, . . .,N−1. A slope S of the original data is calculated by taking the difference between the last data point, r(N−1), and the first data point, r(O). This difference is then divided by the total number of time intervals between the first and last data points, N−1, to obtain the value for the slope S. The new function $r_e(n)$ is then created by forcing the last data point r(N−1) to equal the first data point r(0), and subsequently adjusting each point therebetween by the slope value at the point so that no distortion of the essential interrelationship of the remaining data points will occur. As shown in FIG. 3, the new function $r_e(n)$ is calculated for each point using the equation $r_e(n)$= r(n)-Sn, with n=0,1,2, . . ., N−1. The results of this series of computations can be seen more easily in the diagram of FIG. 6, wherein the original data r(n) is shown by the line of solid triangles (indicating the original data points), and wherein the newly created function $r_e(n)$ is shown by the line of hollow squares (indicating the revised data points). As can be seen, the net effect of the, computations is a simple rotation of the baseline ("baseline tilting") about the first data point r(0), so that the, first and last data points are rendered of equal value with each data point therebetween being adjusted accordingly in accordance with its distance from the first data point.

Figure 4:
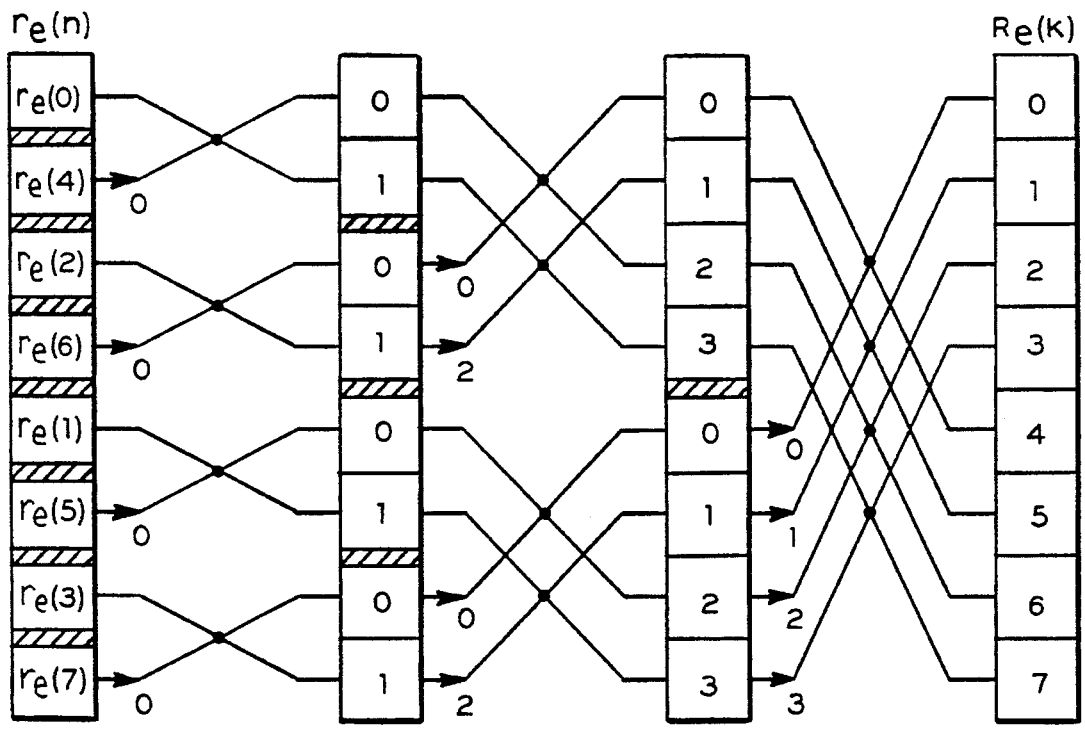
FIG. 4 is a diagrammatic chart illustrating the decimation-in-time FFT algorithm utilizing the baseline tilting technique of the present invention.

FIG. 4 shows the decimation-in-time algorithm for the function $r_e(n)$ of FIG. 3. Thus, each of the initial data points are conventionally cross-multiplied and added as shown in the four indicated cycles to provide an end DC value (0) and the first seven frequencies (1–7) of the spectra in the manner previously described with respect to FIG. 2.

Figure 5:
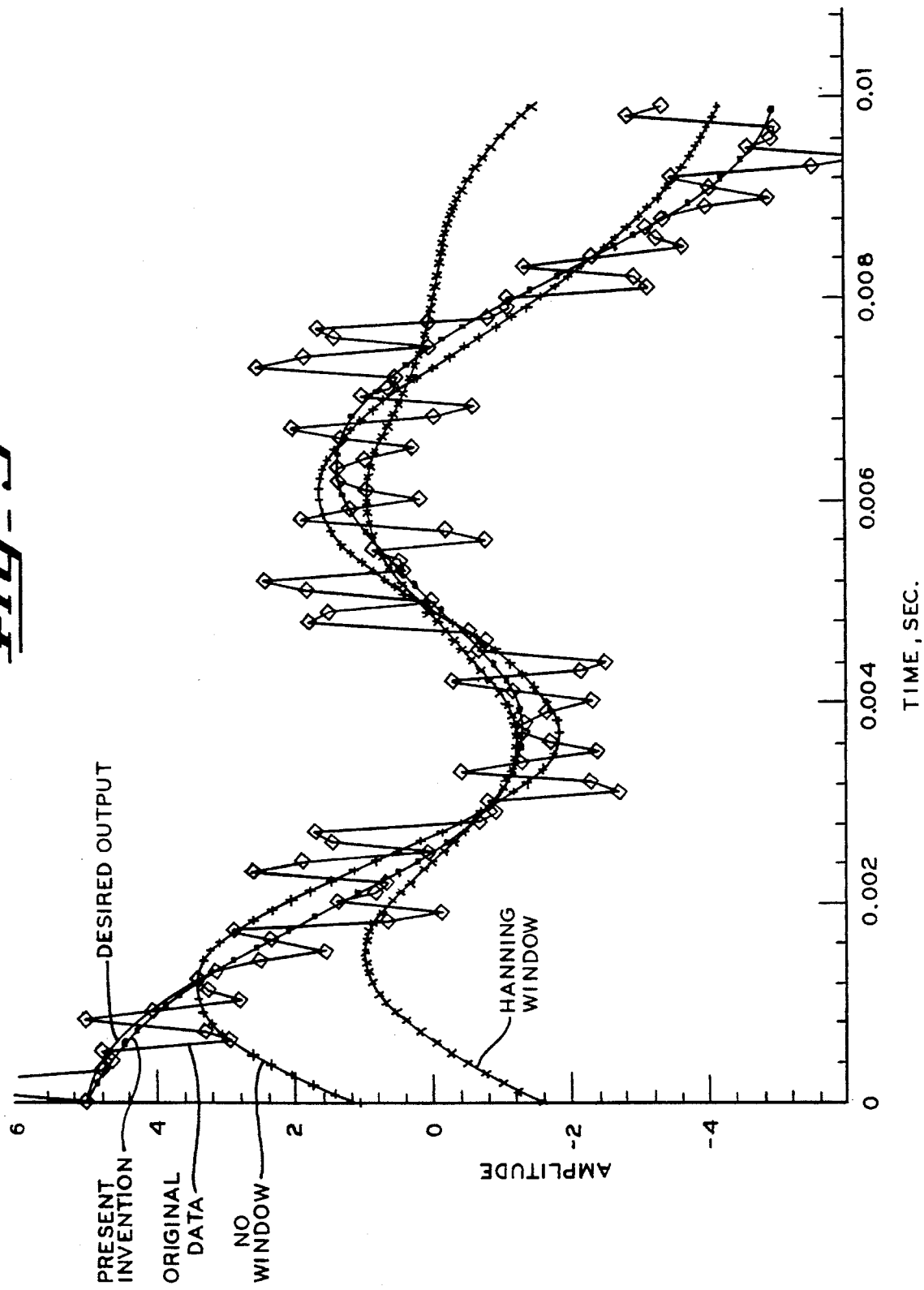
FIG. 5 is a graph depicting a typical digital data sequence and the revised data sequence utilizing the digital filter of the present invention as contrasted with techniques utilized by the prior art.

FIG. 5 illustrates a practical example of the utilization of the digital filter operation of the present invention as shown in FIG. 1. The original data, comprising 100 data points, is shown by the line of hollow diamonds (the data points). The desired output is shown by the solid line, as indicated, with the, output of the present invention being shown by the line of small solid squares. As will be apparent, the filtered data output utilizing the techniques of the present invention very closely resembles the desired output. This can be compared with various prior art techniques as, for example, where no windowing is used. In such a case, the filtered data will produce a track as shown by the line of crosses in FIG. 5 and indicated as such. The widely used Hanning window results in a set of data, as shown by the line of x's, closely tracking the desired output only in the central portion thereof but diverging therefrom at the edges due to the aforediscussed problems inherent in using a window function to alter the original data values.

While only digital filters have been specifically discussed as a means of utilizing the Gibbs phenomenon suppression technique of the present invention, other applications are quite possible. For example, in measuring the attenuation coefficient or quality factor Q from seismic, acoustic, ultrasonic, or other waves, it is conventional to use the spectral ratios of the waves measured at two different distances in the same medium. As with the digital filters, in obtaining the spectra for the attenuation or Q measurement, the original digital waves are transformed into the frequency domain through the discrete Fourier transform and are thus plagued by the aforementioned Gibbs phenomenon. Using the techniques of the present invention by forcing the first and last points of the data to become equal without otherwise distorting the essential interrelationship of the reminder of the intervening data points, a highly accurate representation of the spectral ratios of the original data can be achieved in the manner set forth hereinbefore so as to eliminate the distortion or spectral leakage created by the Gibbs phenomenon. A practical application of this is shown in the chart of FIG. 7, wherein the solid line has been generated with the technique of the present invention by measuring the attenuation in decibels per foot in accordance with increasing frequency in a medium with a wave velocity of 7000 feet/second. Since the waves used were generated from a constant Q=50, the attenuation should be linearly proportional to the frequency, and it can be seen that such is the case (the measurement points were at 600 ft. and 990 ft. from the wave source). This is contrasted with the prior art as indicated by the dashed line, using the Hanning window, and the line of crosses, using no window function at all during the Fourier transform.

Although the best modes contemplated for carrying out the present invention have been herein shown and described, it will be apparent that other modifications and variations may be made without departing from what is regarded to be the subject matter of the invention.

What is claimed is:

1. Digital processing apparatus for providing a frequency spectrum of a digital waveform by computing the Fourier transform of a train of sampled digital signals at uniform time intervals which are initiated at some arbitrary time and which therefore exhibit the Gibbs phenomenon due to discontinuities of the signal waveform at the start and end of the signal train, said apparatus comprising means for receiving a train of such signals over a period of time with said train of signals being represented by a first sequence of discrete numerical values beginning with a first value at the start of the time period and ending with an end value at the end of the time period means for creating a second sequence of discrete numerical values from the first sequence which second sequence begins with said first value and ends with a value numerically equal to said first value and which includes remaining values at said time intervals arranged so that the frequency components of said first sequence remain unchanged except those introduced by the discontinuities in the signal waveform at the start and end of the time period, and means for transforming the second sequence into a plurality of frequency domain component digital signals by using a digital Fourier transform method whereby an accurate frequency domain transformation of the first sequence is accomplished without introducing errors due to the discontinuities at the first and end values of the first sequence to thereby eliminate the Gibbs phenomenon.

2. Digital processing apparatus for providing a frequency spectrum according to claim 1 wherein said means for creating a second sequence of values comprises means for adding a third sequence of numerical values to the first sequence of values to follow said end value at said uniform time intervals which third sequence of numerical values is the exact reverse of the numerical values of the first sequence.

3. Digital processing apparatus for providing a frequency spectrum according to claim 1 wherein said means for creating a second sequence of values comprises means for measuring the difference between said first and end values, means for dividing said difference by the total number of time intervals between said first and end values for defining a slope value, and means for adjusting each numerical value in said first sequence in accordance with the slope value so that the second sequence is created by rotating the first sequence about the first value thereof to the point where the first value and the end value are numerically equal.

4. A spectral resolution process for eliminating the Gibbs phenomenon in a train of sampled digital signals at uniform time intervals comprising the steps of starting the reception of the train of signals at an arbitrary time and stopping the reception of the signals at some later time to thereby receive the signals over a period of time with said train of signals being represented by a digital waveform and defining a first sequence of discrete numerical values beginning with a first value at the start of the time period and ending with an end value at the end of the time period, creating a second sequence of discrete numerical values from the first sequence which second sequence begins with said first value and ends with a value numerically equal to said first value and which includes remaining values at said time intervals arranged so that the frequency components of said first sequence remain unchanged except those introduced by the discontinuities in the digital waveform at the start and end of the time period, and transforming the second sequence into a plurality of frequency domain component digital signals by using a digital Fourier transform method whereby an accurate frequency domain transformation of the first sequence is accomplished without introducing errors due to the discontinuities at the start and end values of the first sequence to thereby eliminate the effects of the Gibbs phenomenon in the transformation process.

5. A process according to claim 4 wherein the step of creating a second sequence of values comprises adding a third sequence of numerical values to the first sequence of values to follow said end value at said uniform time intervals which third sequence of numerical values is the exact reverse of the numerical values of the first sequence.

6. A process according to claim 4 wherein the step of creating a second sequence of values comprises measuring the difference between said first and end values, dividing said difference by the total number of time intervals between said first and end values to define a slope value, and adjusting each numerical value in said first sequence in accordance with the slope value so that the second sequence is created by rotating the first sequence about the first value thereof to the point where the first value and the end value are numerically equal.

7. A process according to claim 4 including the steps of selectively eliminating certain of the frequency domain component digital signals from the transformed second sequence values and retaining only those digital signals of predetermined interest, performing an inverse Fourier transform on the retained frequency domain component digital signals, and outputting a second train of digital signals at said uniform time intervals undistorted by the Gibbs phenomenon.

8. A digital filter comprising means for receiving a train of sampled digital signals at uniform time intervals over a period of time with said train of signals being represented in the form of a first sequence of discrete numerical values beginning with a first value at the start of the time period and ending with an end value at the end of the time period, means for creating a second sequence of discrete numerical values from the first sequence of values which second sequence begins with said first value and ends with a value numerically equal to said first value and which includes remaining values at said time intervals arranged so that the frequency components of said first sequence remain unchanged except those introduced by the discontinuities in the digital signal waveform at the start and end of the time period, means for transforming the second sequence into a plurality of frequency domain component values by using a digital Fourier transform method whereby an accurate frequency domain transformation of the first sequence is accomplished without introducing errors from the Gibbs phenomenon due to discontinuities at the first and end values of the first sequence, means for eliminating certain frequency domain component values and retaining only those frequency domain component values of predetermined interest, and means for performing an inverse Fourier transform on the retained frequency domain component values to provide a filtered sequence of signals comprised of a train of digital signals at said uniform intervals.

9. A digital filter according to claim 8 wherein said means for creating a second sequence comprises means for adding a third sequence of numerical values to the first sequence to follow said end value at said uniform time intervals which third sequence of numerical values is the exact reverse of the first sequence of numerical values.

10. A digital filter according to claim 8 wherein said means for creating a second sequence comprises means for measuring the difference between said first and end values, means for dividing said difference by the total number of time intervals between said first and end values to define a slope value, and means for adjusting each numerical value in said first sequence in accordance with the slope value so that the second sequence is created by rotating the first sequence about the first value thereof to the point where the first value and the end value are numerically equal.

* * * * *